United States Patent
Cederwall et al.

(10) Patent No.: US 8,304,937 B2
(45) Date of Patent: Nov. 6, 2012

(54) AMPG DEVICE FOR GENERATION OF ELECTRICAL ENERGY FROM VIBRATIONS, AN AMPG DEVICE ASSEMBY, AND A METHOD TO OPTIMIZE THE GENERATION OF SAID ELECTRICAL ENERGY

(75) Inventors: Per Cederwall, Jönköping (SE); Dan Erichsen, Bankeryd (SE)

(73) Assignee: Saab AB, Linköping (SE)

( * ) Notice: Subject to any disclaimer, the term of this patent is extended or adjusted under 35 U.S.C. 154(b) by 458 days.

(21) Appl. No.: 12/003,045

(22) Filed: Dec. 19, 2007

(65) Prior Publication Data
US 2008/0174188 A1 Jul. 24, 2008

(30) Foreign Application Priority Data

Dec. 21, 2006 (EP) .................................... 06126914

(51) Int. Cl.
*H02K 7/14* (2006.01)
*H02K 7/065* (2006.01)
*H02J 7/14* (2006.01)
*B60C 23/04* (2006.01)
(52) U.S. Cl. ................ 310/36; 310/29; 310/15; 310/28; 310/17
(58) Field of Classification Search .................... 310/29, 310/36, 328, 330; 73/146.5, 146.8; 340/445, 340/447; *H02K 7/14*; *B60C 23/04*; *H02J 7/14*
See application file for complete search history.

(56) References Cited

U.S. PATENT DOCUMENTS

| 3,470,403 | A | * | 9/1969 | Bey | ................................. | 310/37 |
| 3,500,080 | A | * | 3/1970 | Bey | ................................. | 310/29 |
| 3,984,707 | A | | 10/1976 | McClintock | | |
| 4,187,452 | A | * | 2/1980 | Knappe et al. | ................. | 318/128 |
| 4,709,176 | A | | 11/1987 | Ridley et al. | | |
| 4,992,685 | A | * | 2/1991 | Boon et al. | ....................... | 310/37 |
| 5,578,877 | A | | 11/1996 | Tiemann | | |

(Continued)

FOREIGN PATENT DOCUMENTS
DE 19520521 12/1995
(Continued)

OTHER PUBLICATIONS

Machine Translation of Otte (DE 10055908A1) (2002).*

(Continued)

*Primary Examiner* — Quyen Leung
*Assistant Examiner* — Terrance Kenerly
(74) *Attorney, Agent, or Firm* — Venable LLP; Eric J. Franklin

(57) ABSTRACT

An AMPG device for generation of electrical energy, including a bobbin, at least one magnet, and at least one spring member. The magnet is arranged to be movable together with the spring member. The device is arranged so that when exposed to an acceleration component in a possible path of mobility of the first magnet, the first magnet will, due to its association with the spring member, move in an oscillating manner in relation to the bobbin, so as to generate electrical energy. The device is arranged to at a limiting position of the mobile magnet's path of mobility a spring member with an equal or higher spring constant than the remainder portions of the magnet's mobile path acting on the magnet. An AMPG device assembly includes several AMPG devices. A method to optimize the electrical output of the device adapts the device to the frequencies appearing in the application where it shall be used.

31 Claims, 13 Drawing Sheets

U.S. PATENT DOCUMENTS

| | | | |
|---|---|---|---|
| 6,064,129 A * | 5/2000 | Pompei | 310/12.01 |
| 6,262,500 B1 * | 7/2001 | Wakiwaka et al. | 310/15 |
| 6,441,516 B1 | 8/2002 | Kaelin et al. | |
| 6,704,001 B1 * | 3/2004 | Schena et al. | 345/161 |
| 2004/0256920 A1 * | 12/2004 | Gummin et al. | 310/15 |
| 2005/0023917 A1 * | 2/2005 | Kesting et al. | 310/156.43 |
| 2005/0184601 A1 * | 8/2005 | Kweon et al. | 310/36 |
| 2005/0280218 A1 | 12/2005 | Parison et al. | |
| 2006/0023195 A1 * | 2/2006 | Carter et al. | 355/72 |
| 2006/0028072 A1 * | 2/2006 | Iwasa et al. | 310/14 |
| 2006/0038457 A1 * | 2/2006 | Miyata | 310/156.45 |
| 2007/0085425 A1 * | 4/2007 | Hirashima | 310/15 |
| 2007/0216235 A1 * | 9/2007 | Lee | 310/36 |
| 2008/0278008 A1 * | 11/2008 | Roberts et al. | 310/29 |
| 2009/0072637 A1 * | 3/2009 | Chang et al. | 310/36 |

FOREIGN PATENT DOCUMENTS

| | | |
|---|---|---|
| DE | 29618105 U1 | 4/1997 |
| DE | 10055908 A1 | 5/2002 |
| EP | 1085383 A | 3/2001 |
| EP | 1626144 A | 2/2006 |
| GB | 719977 A | 12/1954 |
| JP | 11234913 A | 8/1999 |
| JP | 2005086902 A | 3/2005 |
| WO | WO-03/071664 | 8/2003 |
| WO | WO-2005/057760 A | 6/2005 |
| WO | WO-2005/106244 A | 11/2005 |
| WO | WO-2006/072539 A | 7/2006 |
| WO | WO20060722539 * | 7/2006 |
| WO | WO-2006/109033 | 10/2006 |

OTHER PUBLICATIONS

Machine translation of WO200607272539, Behrends et al., Jul. 2006.*

Perucchi; Problémes concernant le spiral, rōle de petites déformations; Journal Suisse D'Horlogerie; 1966, pp. 344-347.

European Search Report—Nov. 5, 2007.

Annex to European search report—Nov. 20, 2007.

* cited by examiner 28a, 28b, 481, 482

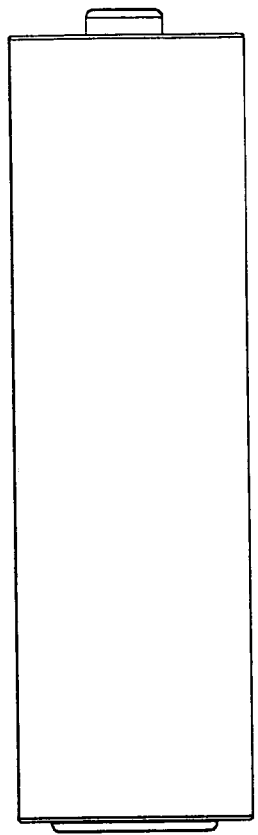
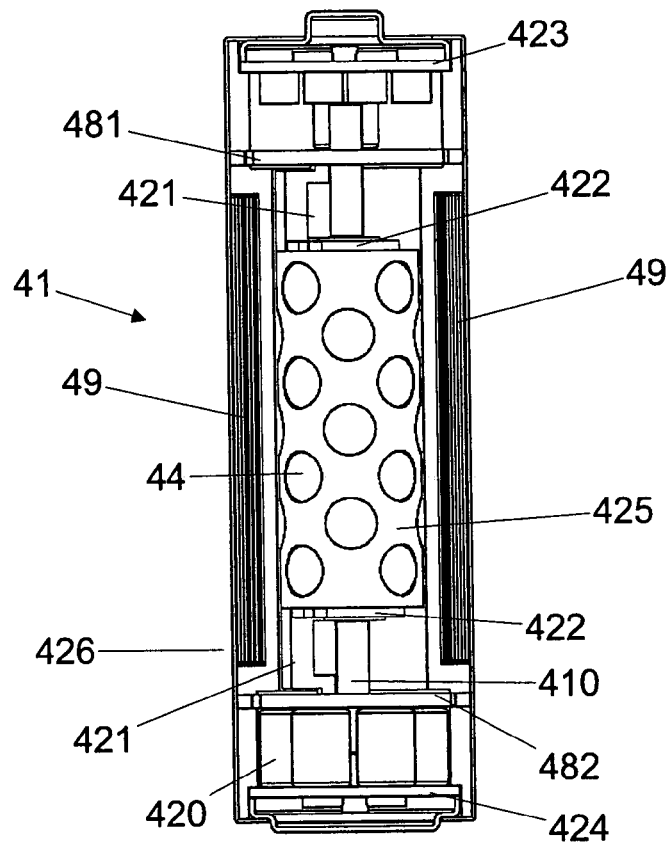
Fig. 5A
Fig. 5B

AMPG DEVICE FOR GENERATION OF ELECTRICAL ENERGY FROM VIBRATIONS, AN AMPG DEVICE ASSEMBY, AND A METHOD TO OPTIMIZE THE GENERATION OF SAID ELECTRICAL ENERGY

FIELD OF THE INVENTION

This invention concerns the production of electricity in applications where normally a battery of some sort is used, in particular this application refers to a Accumulating Motion Pulse Generator device, herein after called, AMPG device. Such applications can be sensors and transmitters for target collection on tanks, laser emitting handheld rifles, radios for communication, laptop computers or any other applications where batteries normally are used. In these applications particularly in the field of combat or combat training, operation of devices during long periods without a need for battery charging is required. In order to extend the operating time on the mentioned applications the present described invention provides a device and a method for optimization of said device for each typical application. For some applications the AMPG devices also act as complete power suppliers, also mentioned as wireless power suppliers.

PRIOR ART

Prior art in the field of the invention includes:

U.S. Pat. No. 4,709,176 wherein a small magnet moves due to acceleration components inside a bobbin in the longitudinal direction of the device, thereby generating electrical energy.

In DE 195 20 521 A1 another solution is demonstrated which is optimised for rail vehicles wherein magnets on a holder moves oscillatingly close to bobbins for generation of electricity.

In more recent, WO 03/071664 A1, an application is shown wherein substantially in the same manner of the previously mentioned U.S. Pat. No. 4,709,176, small magnets can move inside a bobbin for generation of energy. The small magnets have opposing magnetic poles; in the end of the bobbin, there are magnets with opposed magnetic poles with regard to the moving magnets.

In yet another published document, DE 296 18 105 U1 a device for generation of electrical energy is shown, where a magnet is mounted on a blade spring. The magnet reciprocates down into a core which has a coiling in the other end.

In the newly published, WO 2006/109033 A1 a generator for the converting of mechanical vibration energy into electrical energy is shown, wherein a bobbin is rotationally fixed on a movable core, the core comprising magnets and moving relative to a body of high permeability material.

There are also documents discussing the optimization of the use of the devices for generation of electrical energy from vibration energy, such as WO 2006/10937 A1.

GENERAL DESCRIPTION OF THE INVENTION

The claimed invention refers to an AMPG device for generation of electrical energy, comprising, a bobbin, and at least one first magnet, at least one first spring member, wherein said first magnet is arranged to be movable together with said first spring member, said device is arranged so that when exposed to an acceleration component in a possible path of mobility of said first magnet, said first magnet will due to its association with said first spring member arranged move in an oscillating manner in relation to said bobbin, so as to generate electrical energy, said device comprises a second spring member at a limiting position of said mobile magnet's path of mobility, for limiting said path of mobility.

The second spring also called limiting spring, has the effect of helping to store excess amounts of kinetic energy collected by the moving parts of the AMPG device, in addition to limiting the path of mobility. The limiting spring member stores the excess of mechanical energy. The limiting spring member increases the acceleration of the oscillation mass/oscillating magnetic field at a limiting position of the moving mass comprising the said magnet. The limiting spring is the major component for an effective conversion, due to keeping the speed of the changing magnetic field at a high level.

In another embodiment of the AMPG device the second spring has an equal or higher spring constant than the spring constant of the first spring member.

In another embodiment said second spring comprises a helical spring. The effect of using a second spring which is a helical spring is that it's robust, easy mountable and less costly.

In another embodiment the AMPG device's said second spring comprises a cloth, such as a rubber cloth. The rubber cloth is easily mountable, less costly than the helical spring and easier to mount.

In another embodiment the AMPG device said second spring member comprises a plate spring. This has the effect of giving the AMPG a robust configuration. And good manufacturing abilities.

In another embodiment the AMPG device's said springs comprises a spiral spring. For devices being able to collect transversal acceleration components, spiral springs are in one example both used as first springs and second limiting springs.

In another embodiment of the AMPG device said second spring is a plate spring member comprised in said first spring.

In another embodiment the AMPG device the said second spring comprises second magnets, with reversed magnetic field to each other so as to act as a spring. Said second magnets can comprise Neodymium.

In another embodiment of the AMPG device said second spring comprises a combination of second magnets and a mechanical spring. The use of different types of limiting springs in the same device gives more opportunities to optimize robustness, economy and adaptation of the AMPG to its use.

In another embodiment of the AMPG device the said first magnet comprises Neodymium. A neodymium magnet gives a strong magnetic field. The said magnets are also durable against demagnetizing.

In another embodiment of the AMPG device the moving first magnet are arranged to move on the outside of said bobbin. This makes the generation of electricity particularly efficient.

In another embodiment of the AMPG device the outer shape of the AMPG device is arranged so that said AMPG device is mountable in a standard holder for a battery such as a D, C, A, AA, AAA, AAAA or E-block battery or any other standard battery size, for use in a standard battery demanding application.

In another embodiment the AMPG device's outer shell comprises a high friction material. This helps the AMPG device to not move relatively to the holder when exposed to acceleration components, which in turn makes the moving parts of the AMPG device collect said acceleration components more easily.

In another embodiment the AMPG device's shell comprises elastomer.

In another embodiment the AMPG device's shell comprises rubber.

In another embodiment the AMPG device is optimized for collection of acceleration components in its transversal direction by comprising a rotor with an eccentric mass balance, said rotor comprises said first magnet.

In another embodiment of the AMPG device the first spring member is a spiral spring associated with said rotor.

In another embodiment of the AMPG device, the first spring member is a pair of spiral springs, oriented towards each other in opposite direction. Both are connected to said rotor.

In another embodiment of the AMPG device, the first spring member and the second spring member are comprised in the same spring.

In another embodiment the AMPG device is optimized for collection of acceleration components in its longitudinal direction, by associating said first magnet with a spring member of helical type allowing said first magnet to move close to said bobbin in the longitudinal direction of said device.

In another embodiment of the AMPG device, it comprises a bobbin having a core arranged to guide the changing magnetic field through the coil in the bobbin. This makes the magnetic flux more concentrated through the coil resulting in stronger fluctuations of the magnetic field and increases the efficiency of the generation of electrical energy.

In another embodiment of the AMPG device the core is laminated. By changing the magnetic flux profile so as to make it more pointed, a higher magnetic pulse is created than an equal embodiment without core, the generation of electrical energy is thereby increased. The laminated core will increase the effect of the said core due to less magnetic whirl loss.

In another embodiment of the AMPG device the core comprises μ-metal. This will increase the effect of the said core due to extremely good magnetic permeability. The good magnetic permeability results in higher level of the magnetic field through the coil in the bobbin.

In another embodiment of the AMPG device one first magnet is mounted close to another first magnet with essentially the reversed magnetic field direction so as to provide for achieving a quick change of magnetic field, when the first magnets with reversed magnetic fields passes the gap in the core which passes through the bobbin.

In another embodiment of an AMPG device there is comprised a plurality of the first magnets which are mounted close to each other at equally distances between each other, with alternating magnetic field directions. This will result in a rapid change of the magnetic field and increases the ability to oscillate with larger amplitude. It will also increase the number of direction changes of the magnetic field, when the first and the other magnets passes the gap in the said core which passes through the bobbin. The number of magnets, n can be 1<n<∞.

In a further development of the thought of the invention a printed circuit board, PCB, comprises at least one AMPG device of the embodiments discussed above.

There is also within the scope of the invention an AMPG device assembly comprising at least two of the AMPG devices discussed above wherein the AMPG devices are mounted angularly displaced relative to each other, so that the AMPG assembly is able to collect acceleration components in more than one direction.

The claimed invention also refers to an AMPG device for collecting and storing mechanical energy from outer environment, to be converted to electrical energy, stored as power supply for any electrical consumers, comprising at least one oscillating mass comprising at least one magnet, at least one main spring member or link arm member associated to the oscillating mass, wherein said magnet is arranged to be movable together with at least one end off the said main spring member. The other end of said spring member is connected to at least one base. Said AMPG device is arranged to when exposed to an acceleration component, the movement reaction to be stored as mechanical energy in the oscillating mass. The mechanical energy is converted to electrical energy in a bobbin. The conversion of energy is made with an, in polarity direction and/or in magnitude changing magnetic field. Said AMPG device comprises at least one limiting spring member. The limiting spring member stores the excess of mechanical energy. The limiting spring member increases the acceleration of the oscillation mass/oscillating magnetic field at a limiting position of the moving mass comprising the said magnet. The limiting spring is the major component for an effective conversion, due to keeping the speed of the changing magnetic field at a high level.

In all embodiments of the AMPG device the limiting spring has a higher or equal spring constant compared to the main spring constant as a result of all main spring members.

The relation between the main spring constant and the limiting spring constant is given by the wanted AMPG device's resonance frequency basically dimensioned with the formula:

$$f(\text{resonance}) = (1/(2 \times \pi)) \times \sqrt{(k/m)}$$

Where k is the resulting spring constant of all springs in the AMPG device system when the moving mass is at the returning point and m is the total moving mass.

This relation between the main spring-/main spring members spring constant, k(main) and the limiting spring-/limiting spring members spring constant, k(limiting), will result in two characteristic resonance frequencies for the AMPG device, f(resonance-low) and f(resonance-high).

The lower resonance frequency, f(resonance-low) is the result of the main spring/main spring members spring constant and the moving mass/masses according to the formula, mentioned later, and is the AMPG device's basic run mode at a lower frequency spectrum.

The higher resonance frequency, f(resonance-high) is the result of the main spring/main spring members spring constant together with the limiting spring/spring members spring constant, when those springs are at the moving mass/masses returning point, (also possible to be measured as, the total force divided by the total deflected length, when the moving mass/masses are forced at the returning point), and the moving mass/masses according to the formula, mentioned later, and is the AMPG device's high efficiency run mode at a higher frequency spectrum.

Those frequencies are significant for the method used for optimizing the AMPG device's total efficiency. The method will be explained in a separate section of the document.

All spring members can be off all known spring types, which are used as machine elements, for example plate spring, coil springs, beam springs, spiral springs, helical springs, rubber springs, magnetically springs, air springs, etc, as long as the spring has a spring constant and a deflection length.

In all spring cases, a combination of different types of springs can be used. Some spring elements can act as both main spring and limiting spring depending on its grade of deflection. For example, a spiral spring can act as a main spring initially and switch over to be a limiting spring when it has been fully winded up. This effect is because of the short plate spring section at the spiral springs inner end attachment.

In another embodiment the said AMPG device is shielded. This shielding is a so called Electro Magnetic Compatibility shielding, known to the skilled man as EMC.

Further, in the thought of the invention is comprised a method to optimize the electrical output from a AMPG device comprising the steps of, Method of to optimize the electrical output from an AMPG device, comprising the steps of, determining a frequency range of the vibrations emerging from the application in which the AMPG device is intended to be used, adapting at least on of the AMPG-device's resonant frequencies to the detected frequency range.

using the AMPG device in an application with vibrations in the frequency interval comprising said measured frequency of said application.

Further, in the thought of the invention is comprised using of an AMPG device wherein the AMPG device is used as a self powered motion sensor.

Further, in the thought of the invention is comprised using of an AMPG device wherein the AMPG device is fed with electrical current and thereby is used as an oscillating electrical motor.

DESCRIPTION OF THE DRAWINGS

FIG. 5A-C shows an embodiment where the AMPG device has a cylindrical form and collection of acceleration components is enabled in the transversal direction of the AMPG device, in FIGS. 5B and 5C the AMPG device is shown in a split view where it has been cut in half in the longitudinal direction for better view, except for some parts comprising the magnetic holder, magnets, and spiral springs.

DETAILED DESCRIPTION

In the description below are several preferred embodiments of AMPG devices, described. This description should not be taken as limiting.

Figure 1:
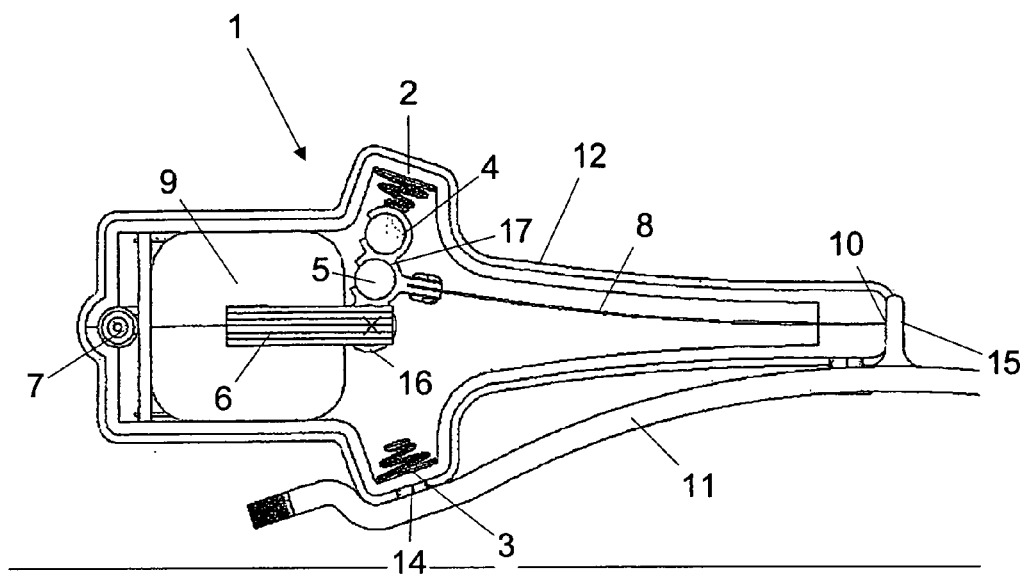
FIG. 1 shows an embodiment of an AMPG device comprising a plate spring as a first spring member and two conical helical springs as limiting springs.

A first preferred embodiment of the said invention is provided in FIG. 1, where an AMPG (Accumulating Motion Pulse Generator) device 1 for generation of energy is provided. Said device 1 has plate spring 8, made preferably of spring steel, steel or any other material with the appropriated spring properties, said plate spring 8 is at one end attached at an attachment point 10. This point 10 is called the base. At the opposing end three magnets 4, 5, 16 are mounted in a magnet holder 17. The holder 17 is mounted on said plate spring 8. The magnets 4, 5, 16 can preferably be made of neodymium or alloys there of or any other material with good magnetic properties. The magnets 4, 5,16 have an alternating orientation north-south, south-north and north-south of the magnetic poles. The direction of the created magnetic field is essentially in the direction perpendicular from the viewed plane of the device 1. The direction of the magnetic field leaving or coming out of the poles of respective magnet, 4,5, 16. One end of the plate spring 8 is arranged to move freely in a sector of the spring 8 deflection, circle like. Said deflection is limited by two limiting springs 2,3. The limiting springs are preferably made of spring steel, steel or another appropriate material such as plastic or rubber with the appropriate elastic properties. Said limiting springs 2, 3 have an equal or higher spring constant, than that of the plate spring 8.

In the device 1 is also a bobbin 9 provided. The bobbin has a laminated core 6 inside. The core 6 is made preferably from L-metal, or any other material with good magnetic permeability. The core 6 has a gap in which the magnets 4, 5, 16 are passing when the moving mass of the device comprising the plate spring 8 moves due to exposure of acceleration components. The device 1 is shown as an externally mounted AMPG device, being mounted on a holder 11. The device also has a protecting shell 12 enclosing the inner electricity generating members of the device 1. The device 1 is attached to the holder 11 in at least two points 14, 15, by any means provide for attaching, such as gluing, screwing, riveting, welding, soldering, or any other means known to the person skilled in the art.

The AMPG device 1 comprises also a connector 7 for connection with an electric load. When exposed to an acceleration component in a path of mobility of the plate spring 8, the moving mass of the device comprising magnets 4, 5, 16 will receive kinetic energy. This energy is as the movement progresses turned into potential energy in the plate spring 8. As the kinetic energy approaches zero the movement is slowed down until all the kinetic energy, neglecting the converted electrical energy and losses such as internal friction, has been stored as potential energy in the plate spring 8. Then the potential energy of said plate spring 8 accelerates the moving mass comprising the magnets 4, 5, 16 in the reversed direction until the potential energy has been stored in the other end of said moving path. When the magnets 4, 5, 16 with reversed magnetic field passes the core 6 which is associated with said bobbin 9, electricity is generated. Due to the shown configuration wherein the magnets are moving outside the bobbin 9, but closing the magnetic circuit instantaneously, in the gap in the core 6 and because of the abrupt changing of the magnetic field due to the reversed configuration of the magnets 4, 5, 16, an effective generation of electrical energy is achieved. As the kinetic energy is transferred to potential energy and back into kinetic energy in a known manner, the magnets 4, 5, 16 will move in an oscillating manner passing the core 6 in reversing direction for each internal transfer between kinetic energy and potential energy and vice versa.

In some cases the kinetic energy is too large to be stored in the plate spring 8. In such case the magnet holder 17 will alternating transfer the excess kinetic energy to a limiting spring 2, or 3. In the shown case of FIG. 1 the limiting spring 2 that receives the kinetic energy and stores that as potential energy and resend this energy into the moving parts of the AMPG device 1. This use of limiting springs 2,3 with a equal or higher spring constant has proven to be very favorable when it comes to generation of electrical energy in a AMPG device such as the one provided in FIG. 1.

Figure 1A:
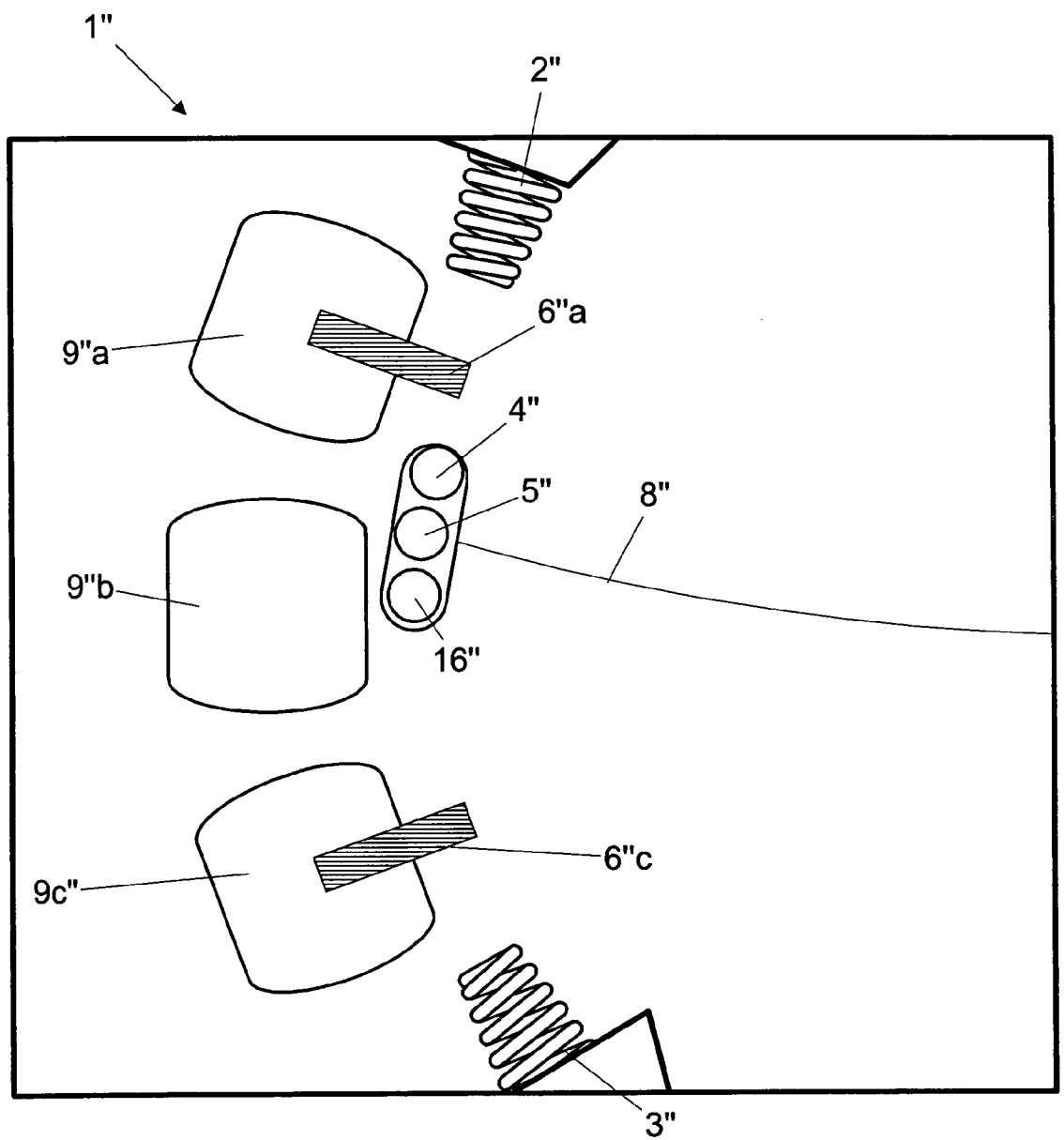
FIG. 1A shows an embodiment where three bobbins are used.

In an alternative embodiment schematically shown in FIG. 1A, of the AMPG device of FIG. 1, the single bobbin is exchanged with three separate bobbins 9"a-c. One of the bobbins 9"b is without μ-metal core and is positioned in the center of oscillating path of the moving mass, equal to the position of equilibrium of the moving mass when not moving. The other two bobbins are equipped with k-metal cores in the same way as shown in FIG. 1. The bobbins 9"a, 9"c with cores 6"a, 6"c are located at each end of the oscillating path of the moving mass. This type of embodiment will cover a wider spectrum of amplitudes and a wider spectrum of frequencies.

In an alternative embodiment, not shown, of the AMPG device of FIG. 1, is the point 15 the only attachment point. The said point 15 is attached in a hinged manner for example with an axis in a bearing or in another known way. By the said point 15 acting as a hinge the whole AMPG device 1 is arranged to be movable in a circle sector manner up to a limiting sector support. This means an acceleration component with low frequency can move essentially the total mass of the AMPG device and transform the acceleration to a higher frequency with regard to internally moving parts. The whole AMPG device will then in a clattering manner transform said acceleration component into mechanical energy altering between kinetic energy, potential energy and finally transformed to electrical energy. The size of these energies will of course be affected by a minimized amount of losses such as friction, internal friction, heat and magnetic flux losses.

Figure 2:
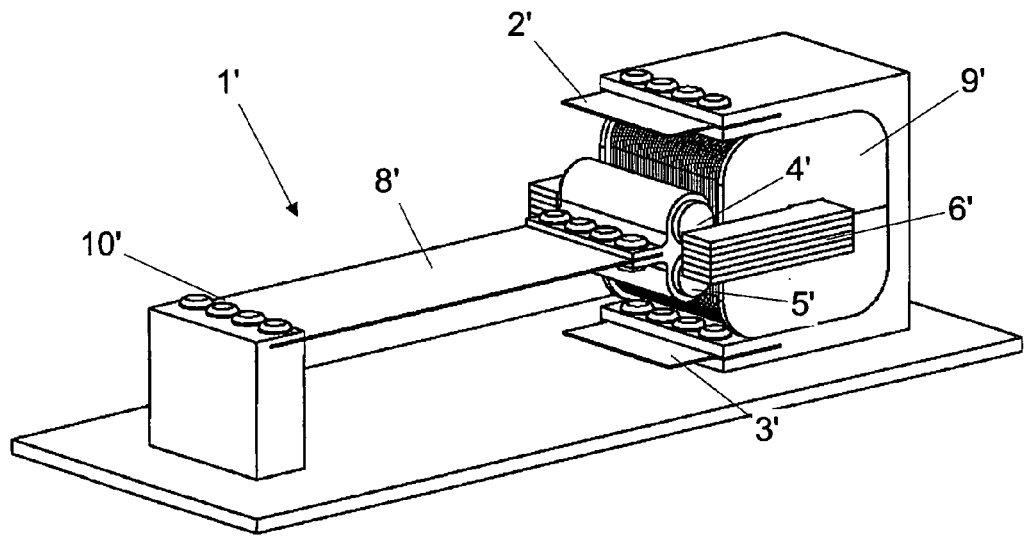
FIG. 2 shows an embodiment of an AMPG device with two plate springs as limiting springs, and two oscillating magnets.
Figure 1B:
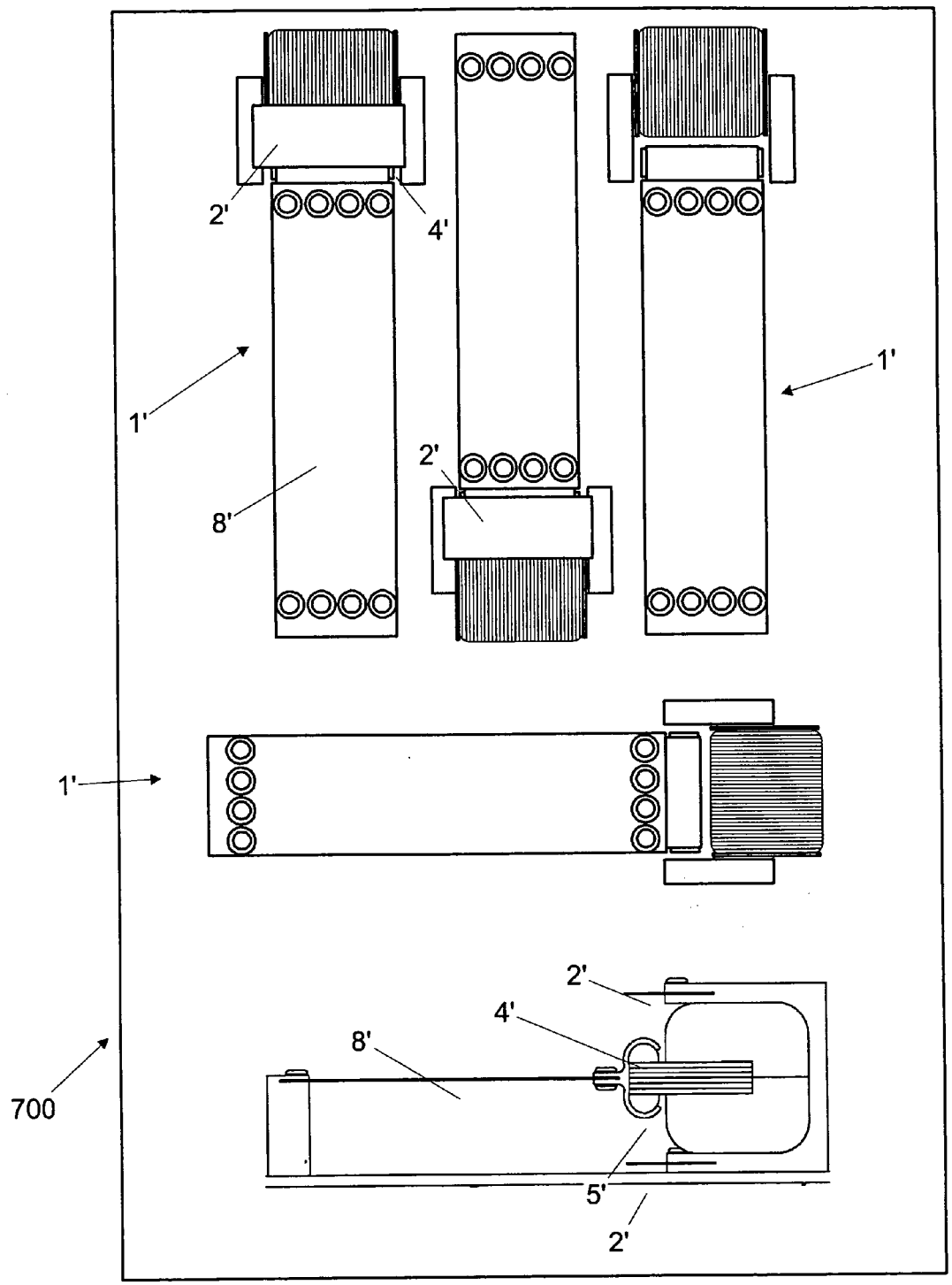
FIG. 1B shows a printed circuit board where several AMPG devices are mounted.

In a further alternative embodiment, shown schematically in FIG. 1B, of the AMPG device 1 of FIG. 1, said device is provided in a form where the base connected to the moving parts and the bobbin with the μ-metal core and the limiting springs 2' are directly mounted on a printed circuit board 700. In this case the cover can be left out. The limiting springs 2' can optionally be in the form of rubber cloths springs or plate springs as shown in FIG. 2. The limiting springs 2' in the FIG. 1B have been left out on two of the shown devices for a better view, but it should be understood that they are normally present. This kind of embodiment is suitable to be miniaturized and multiplied. A plurality of these AMPG devices of this embodiment can by advantage be mounted directly on a printed circuit board, for adaptation to desired amount of electrical energy and to use all available empty space on the printed circuit board. Optionally they are mounted in different directions for collecting acceleration components of different directions.

Figure 3:
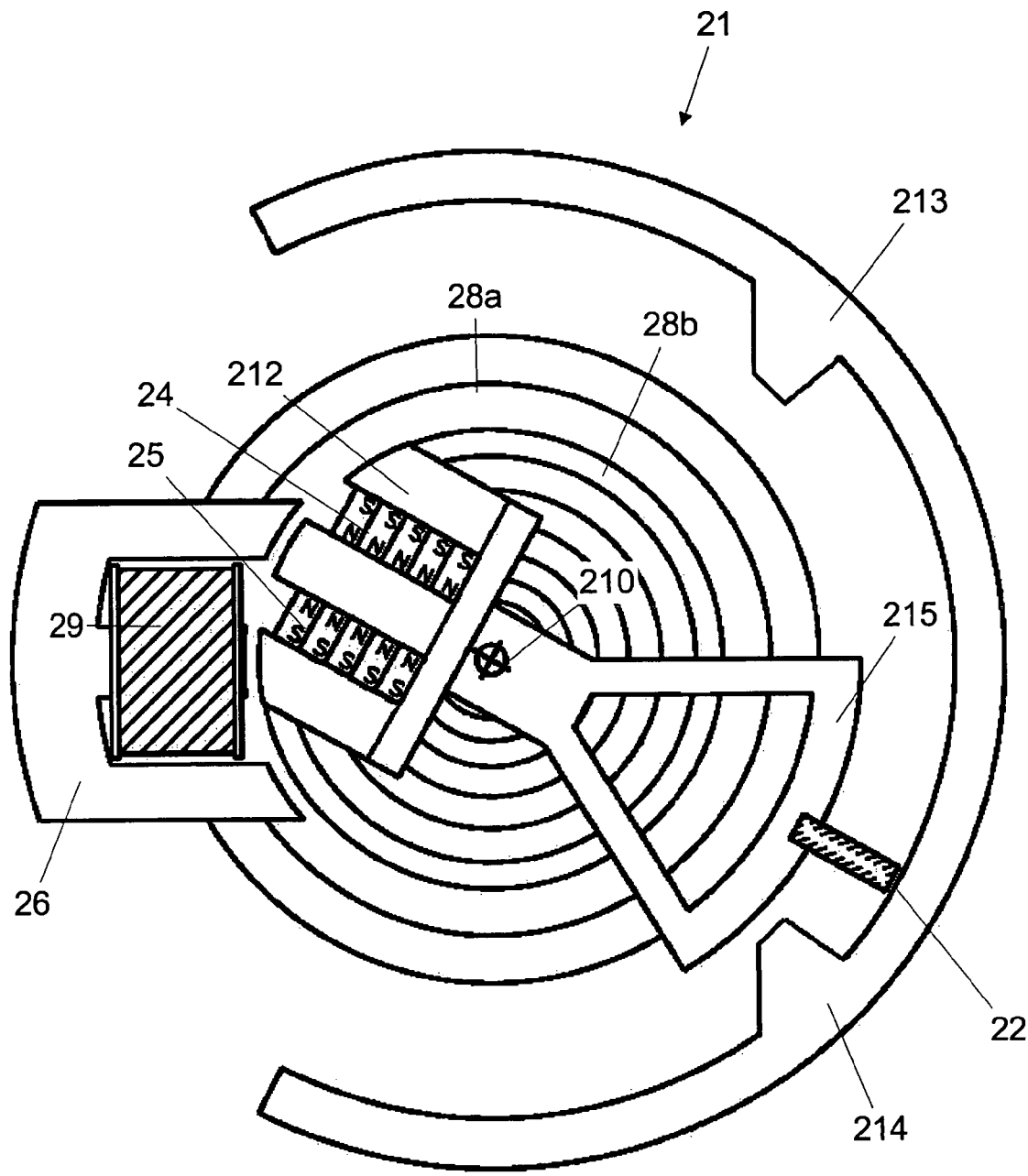
FIG. 3 shows an embodiment of an AMPG device having a configuration which is flat and comprises a spiralspring.

FIG. 3 shows an embodiment of an AMPG device 21 of said invention, this embodiment is particularly favorable when the space is limited in one dimension since it can be made very flat. But of course it's scaleable in all dimensions. The AMPG device 21 comprises a pair of spiral spring 28a, 28b and magnets 24, 25 with reversed magnetic field. Said magnets can for example be of neodymium or alloys from this or any other material with good magnetic permeable properties. The magnets are mounted in a holder 212 in a clamped manner. The holder 212 is part of a laminated μ-metal core and has the shape of an E. This part can off course be made of any other magnetically permeable metal alloy having the right properties. For conducting the magnetic field in the best way the aisles of the E are rounded to narrow the distance to the other fixed part of the laminated μ-metal core 26. The fixed part of said core 26 has also the shape of an E. The fixed part of the core 26, has also a matching rounded shape of the section close to the path of mobility of the holder 212. Thereby can the distance be minimized between the holder 212 and the core 26. The AMPG device 21 of said embodiment accordingly has the advantage that the gap between the core 26 and the magnetic holder 212, which conducts the magnetic field from the magnets 24, 25 so that the magnetic circuit is closed to the core 26 when passing of the core is effectuated by the rotor 215, holder 212, magnet 24, 25 assembly, can be small down to hundredths of millimeter such as 1 hundredths of a millimeter. A small gap is important for god generation of electricity. The holder 212 is mounted on a rotor 215. The rotor 215 has an eccentric mass balance to optimize the ability to collect acceleration components. A limiting spring 22 is arranged in the rotor 215. The limiting spring 22 is preferably as above made from spring steel, steel or any other appropriate material such as plastic material or rubber with good spring properties. This limiting spring 22 is arranged to act on the stops 213, 214. These stops 213, 214 are at the limiting position of the motion of the rotor 215. The device further comprises a bobbin 29. The rotor 215 has an axis 210 which is journalled in bearing, such as a ball bearing or a needle bearing, or another bearing with low friction, or a set of such bearings. The axis 210 is placed eccentrically in the rotor 215, with regard to the mass balance, i.e. so that the masses on each side of the axis 210 are differing. The pair of spiral springs 28a, 28b are connected to the rotor 215. Thereby it acts on the rotor 215 when, said AMPG device 21 is exposed to an acceleration component in a direction which is essentially tangential to the circular sector moving path of the rotor 215. In the same manner, as described for the first embodiment of FIG. 1, the pair of spiral springs 28a and 28b will store kinetic energy as potential energy. If the kinetic energy is to large to be stored by the pair of spiralspring 28a and 28b it will be stored by limiting spring 22. The limiting spring 22 will cooperate with the stops 213, 214, and store the excess of kinetic energy. This storage of energy will in both cases be in the form of potential energy in the springs 28a, 28b, 22 respectively, and will be transferred back into kinetic energy, by the springs 28a, 28b, 22 until the magnets 24, 25 has passed the core 26, and the bobbin 29, and a new build up of potential energy will take place in an oscillating manner so that it changes the direction of the magnetic flow in the second part of the laminated core 26, which passes through the coil of conducting material such as copper wire, a bobbin 29. The resulting oscillating movement will continue until all potential and kinetic energy has been transformed into electrical energy, neglecting losses. In the device 21 the difference in spring constant of the limiting spring 22 and the spring 28 is of the same order as mentioned for device 1 above. The device 21 can as mentioned above also be mounted on a printed circuit board.

Figure 5C:
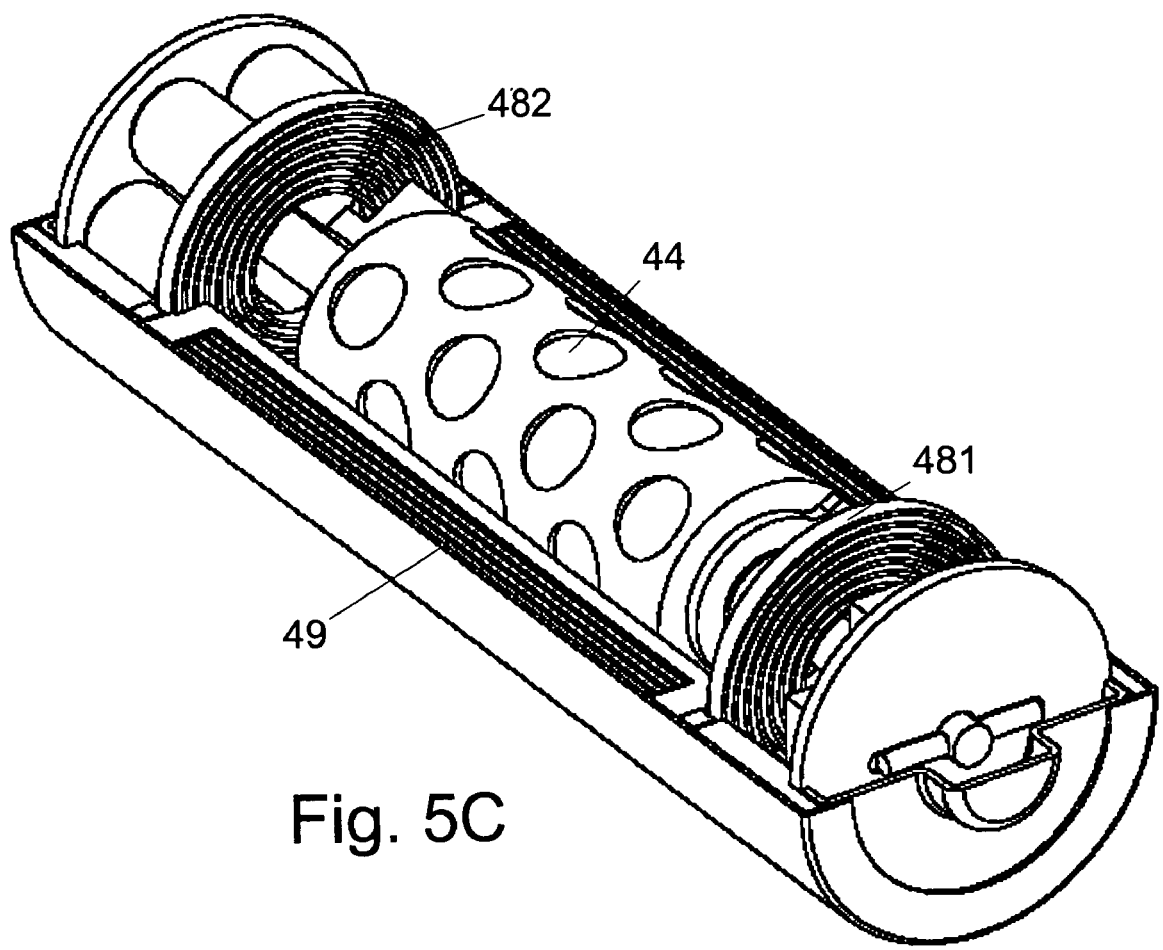

In FIG. 5A-C is another device 41 shown. In this device the cylindrical form has been a limiting factor since the aim has been to comprise the AMPG abilities in a standard battery package such as D, C, AA, AAA, AAAA, E-Block or any other battery form of known kind. This AMPG device 41 comprises, magnets 44 mounted in a essentially cylindrical holder 425, a bobbin 49, a first printed circuit board 423 comprising semiconductor electronics, rectifier bridge with diodes and contact components to the battery positive pole a second printed circuit board 424 comprising accumulation electronics and ultra capacitors 420 and contact components to the battery negative pole, and an axis 410 fixed on the respective printed circuit boards 423, 424. The axis 410 is fixed and the moving mass of the AMPG comprising the magnets 44 and the holder 425 are connected to the axis with bearings 422. Said axis is also possible to attach to the respective end of the body structure. Further comprised are eccentric weights 421, spiral springs 481 and 482 one mounted in clockwise direction and the other in counter clockwise direction.

Figure 4A:
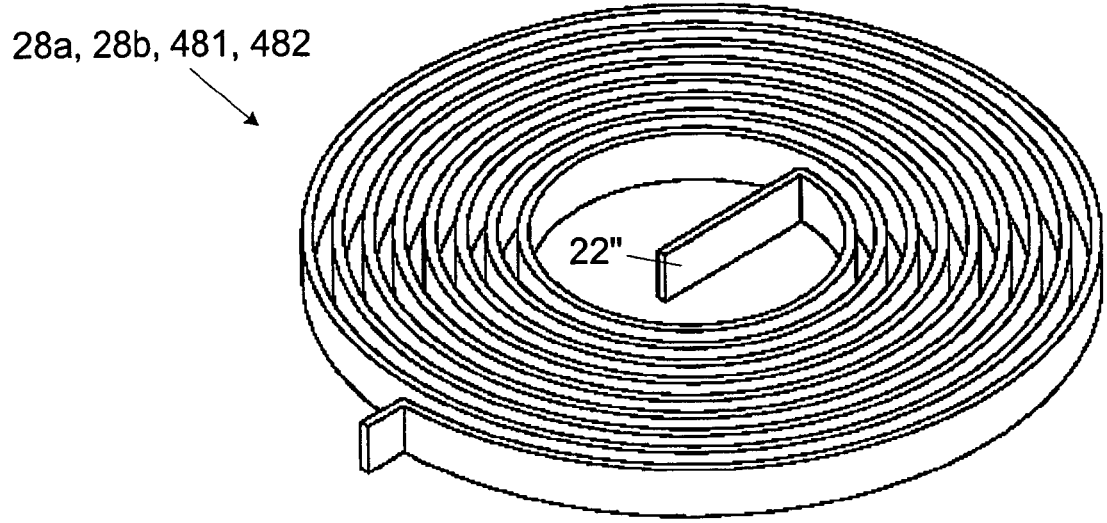
FIG. 4A-B shows a spiral spring comprising a limiting spring member.
Figure 4B:
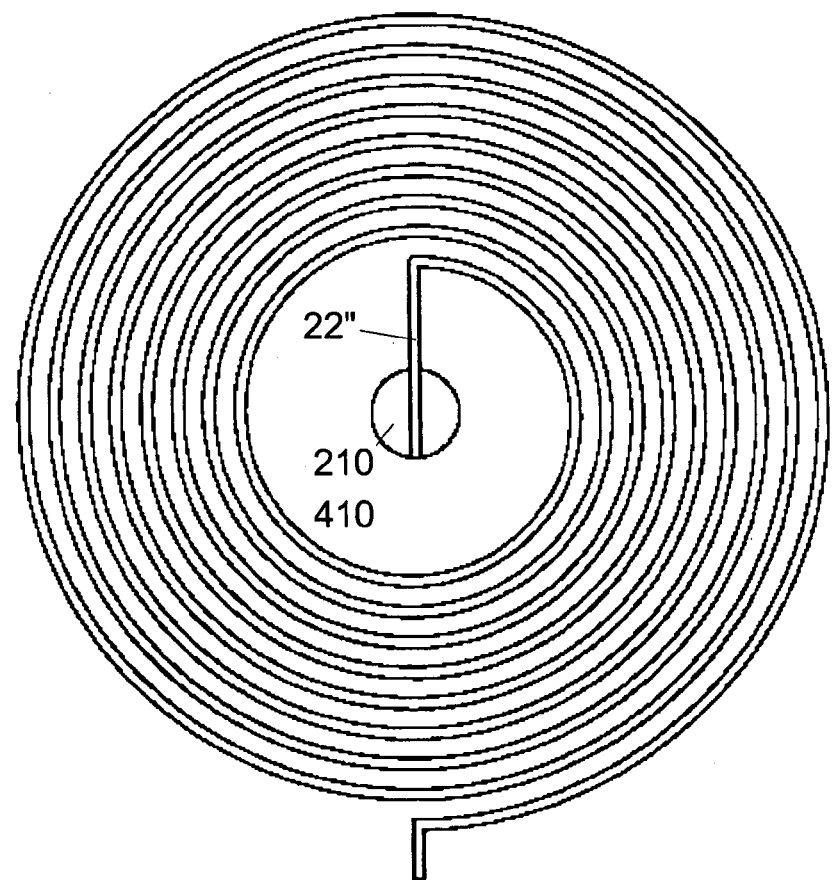

Said spiral springs comprise a limiting spring member 22", as seen in FIG. 4A-B. The limiting spring member 22" acts when the spiral spring on one end has been fully wound up. The function of the limiting spring member 22" is essentially that of a plate spring. The limiting spring member 22" is also the attachment point to the eccentric weight 421, also connected to the magnetic holder 425.

The individual magnets 44, are orientated in a cylindrical system so that their magnetic flux is oriented radially. This means that each magnet 44 is oriented radially with regard to the cylindrical holder 425. The magnets 44 are essentially oriented perpendicular to the longitudinal windings of the bobbin 49. I.e. at the outer perimeter of the holder 425, are all magnets configured with the same polarity. And consequently the reversed polarity of each magnet 44 is pointed at the center axis of the magnetic holder 425.

Preferably the magnets 44 are made from Neodymium or other suitable magnetic material such as ferrite. As is shown in FIG. 5B-C there are cylindric magnets 44 circumferentially mounted on the perimeter of the cylindric holder 425. The magnets 44 can of course be replaced by one single magnet, preferably with a solenoidal shape so that the holder can be dispensed with it. The holder 425 can optionally be fitted with magnets 44 in non regular manner so that the eccentric mass balance is augmented.

The outer shell 426 of the AMPG device 41 is preferably made in a high friction material such as elastomer, rubber, or other materials having the ability to add friction to the outer shell. This high friction counteracts rotation of the whole AMPG device 41, relative to the AMPG holder, when exposed to acceleration components trying to rotate it. This shell material will also have the function as an insulator.

When the device 41 is exposed to an acceleration component in the transversal direction, the moving parts of the AMPG device 41 will move in a manner explained above. The springs 481 and 482 will collect and release potential energy alternately, in a symmetrical way, because of their clock wise and counter clock wise mounting. Due to the limiting spring member 22" as seen in FIG. 4A, the excess of kinetic energy will be stored in the limiting spring member 22", acting as a limiting spring within the respective spiral spring 481, 482. This storing will essentially occur when one spiral spring 481, 482 at one end is fully winded up.

Eccentric weights 421 will ad imbalance to the moving parts making, as mentioned above, it possible to collect acceleration components in a transversal direction. Said bobbin 49 has a coiling in the AMPG device's 41 longitudinal direction. The material of the bobbin 49 is preferably copper, or other suitable electricity leading material.

Figure 6:
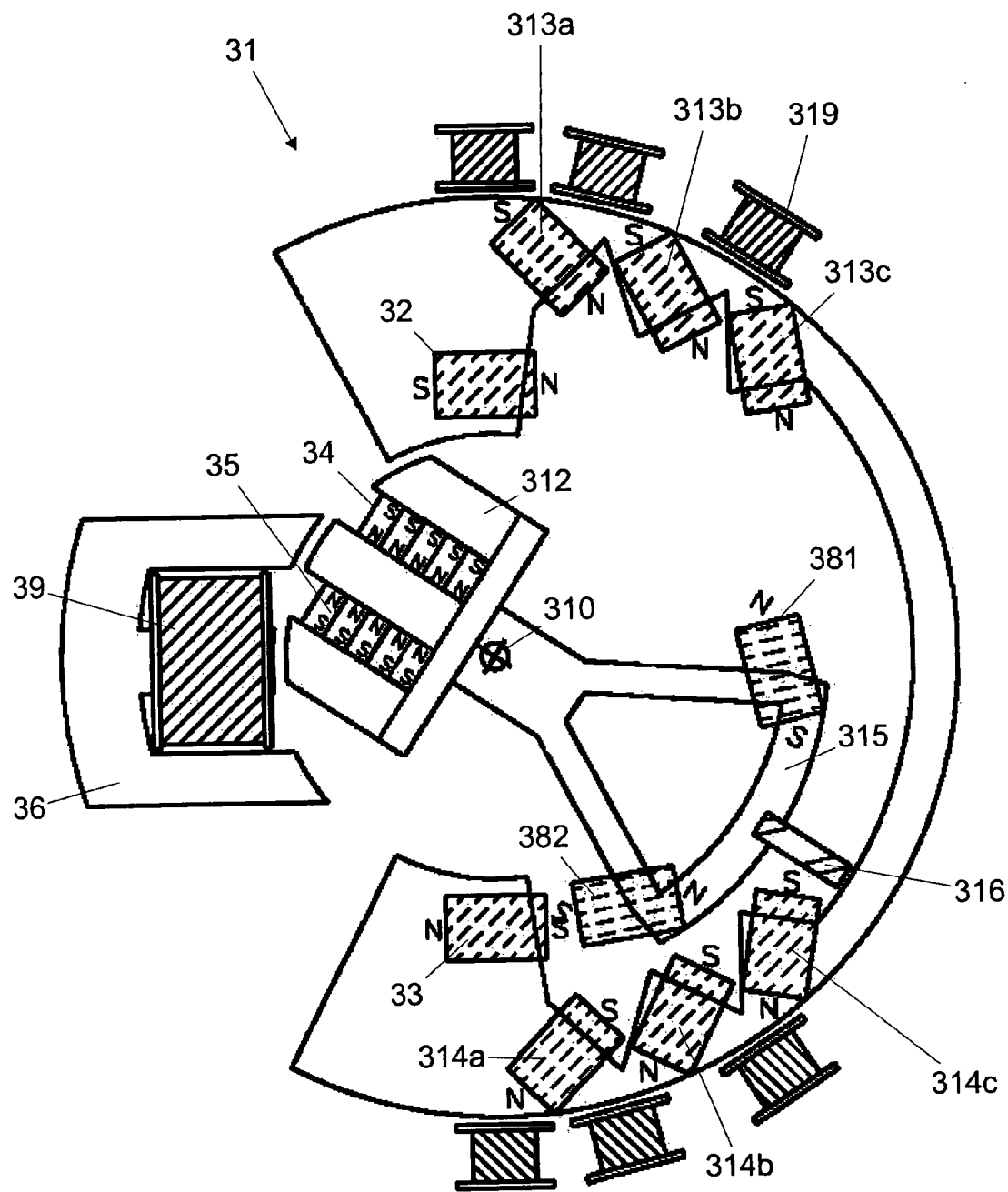
FIG. 6 shows an embodiment of an AMPG device where the spiral spring in FIG. 3 is replaced with magnetic springs instead.

Another embodiment of an AMPG device 31 is shown in FIG. 6. This device 31 has many features in common with the AMPG device 21 discussed above. Rotor device 315, magnets 34, 35, holder 312, bobbin 39, core 36, and axis 310 with bearing are essentially the same as the AMPG device 21 in FIG. 2. This AMPG device 31 has main springs and limiting springs being in the form of magnet springs 381 382. The Magnets 381, 382 are situated on the rotor 315. The magnets 381, 382 has a magnetic field which is reversed compared to the respective limiting point magnets 32, 33 at the respective limits of the movement path circle sector, so as to function as magnetic springs.

Figure 7A:
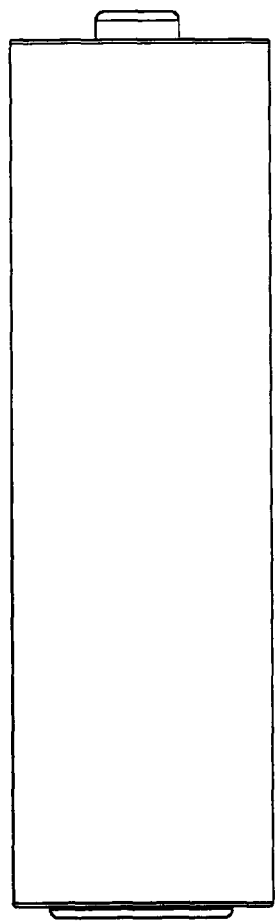
FIG. 7A-C shows an embodiment of an AMPG device where the AMPG device has a cylindrical form, the AMPG device has a oscillating mass moving in the longitudinal direction of the device for collection of acceleration components in the longitudinal direction of the device, in FIGS. 7B and 7C the AMPG device is shown in a split view where it has been cut in half in the longitudinal direction for better view, except for some parts comprising the magnetic holder, magnets, and helical springs.
Figure 7B:
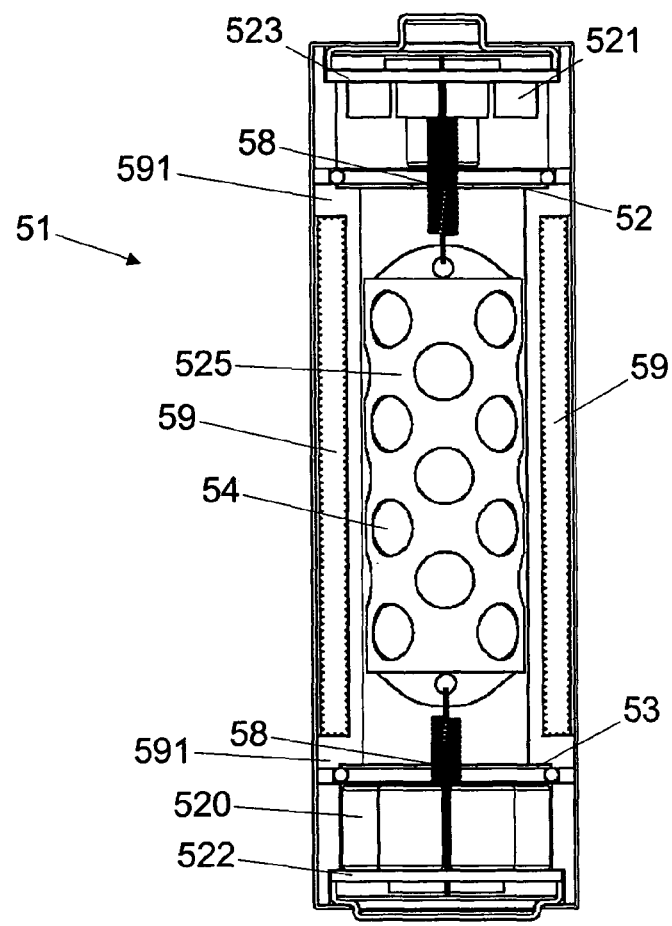
Figure 7C:
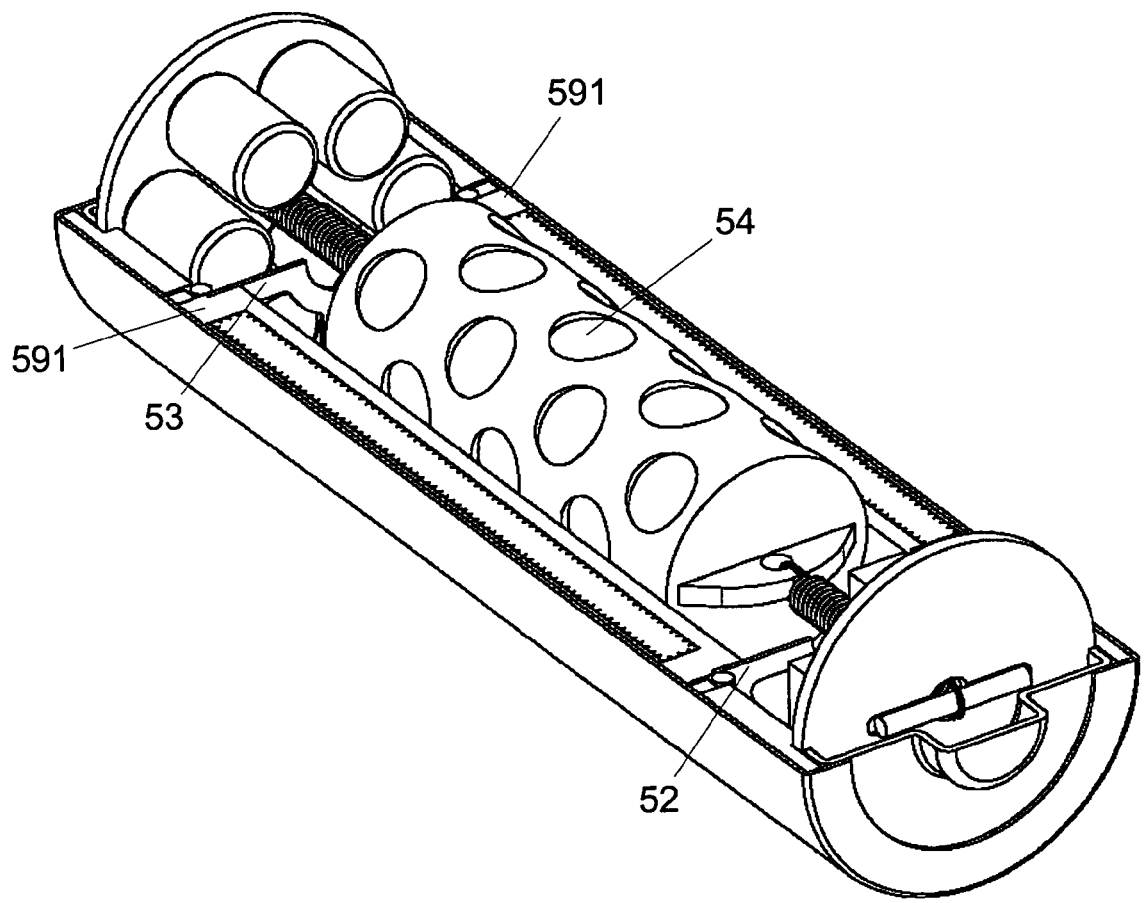

A number of smaller extra bobbins 319 are arranged outside the magnetic springs 313a-c and 314a-c. The bobbins 319 are arranged to collects changes in the magnetic field from the magnets of the magnetic springs 313a, 313b, 313c and 314a, 314b, 314c. An extra protection for the limiting springs 32, 33 is provided by an extra limiting spring 316 arranged on the rotor 315. The extra limiting spring 316 is made in for example steel, spring steel or rubber or any other elastic material. The function of the AMPG device 31 is essentially the same as that of the device of FIG. 3. The magnets 381, 382, cooperate with the magnets 313a, 313b, 313c and 314a, 314b, 314c and stores the excess of kinetic energy as potential energy and transforms said stored potential energy as kinetic energy again, in a manner mentioned above, so that the moving parts of the AMPG device 31 performs an oscillating movement, when exposed to an acceleration component in the moving direction of said moving parts. When the kinetic energy in the rotor 315 is to large to be collected by the magnetic springs 313a, 313b, 313c and 314a, 314b, 314c the limiting spring magnets 32, 33 will collect the excess of kinetic energy. If said kinetic energy is too large to be stored in the magnetic springs the limiting spring 316 will act as collector of the last excess of kinetic energy. Said rotor assembly has an axis 310 placed eccentrically as mentioned above so that it will rotate when exposed to acceleration components in the direction of possible motion path. The AMPG device 31 is as the device in FIG. 3, very easy to produce flat. One or a plurality of devices 31 can as mentioned above also be mounted on a printed circuit board. All the bobbins are electrically connected so that all electrical energy will be taken care off The shown embodiment of FIG. 7A-C shows an AMPG device 51 for collection longitudinal acceleration components. The outer cylindrical shape of the device 51 is the same as that mentioned above for device 41. Comprised in this embodiment 51 are magnets 54, a magnet holder 525, suspended in pretensioned helical springs 58. Further comprised is a bobbin 59. And also comprised are limiting springs 52 and 53.

The bobbin 59 is coiled transversally. The holder 525, which is preferably cylindrical, is freely suspended in the pretensioned helical springs 58 with a preferably cylindrical gap to the outer cylindrical structure, bobbin chassis 591. This means that the holder 525 comprising the magnets 54 is arranged to move essentially without friction. Each magnet 54 is mounted in the same way as in the embodiment of FIG. 5A-C. The limiting springs 52, 53 are preferably plate spring roundels. The material of the limiting springs 52, 53 is preferably spring steel or another suitable elastic material. The limiting springs 52, 53 are fastened to the bobbin chassis 591 in each end of the bobbin chassis 591.

When said magnets 54 are moved relatively to said bobbin in a perpendicular manner, a current will be induced an electrical energy is achieved from kinetic energy of the magnetic holder 525, and magnets 54, assembly. The acceleration component in a longitudinal direction of the AMPG device 51, can be so large that the helical springs 58 cannot store all the kinetic energy as potential energy. In that case the limiting springs 52, 53 will act to store the kinetic energy and resend it. When the moving parts of the AMPG device 51 moves in the longitudinal direction due to an exposure of an acceleration component in that direction, the magnetic holder will if the component is strong enough bounce against the limiting springs in an oscillating manner, the frequency of this oscillation will be kept as long as these bounces occur. This is due to the fact that the spring constant of the limiting springs 52 and 53 are equal or larger than the spring constant of the helical springs 58 in the order as mentioned above. The helical springs 58 are mounted on the printed circuit boards 522 and 523. Optionally the helical springs 58 can be mounted in each the end of the body structure of the AMPG device 51. Comprised in this embodiment are of course all the electrical components mentioned in the embodiment 41, and of course can embodiment 51 have a single magnet and magnets of neodymium and other material configurations as mentioned earlier in the other embodiments.

The mentioned embodiments above shall not be taken as limiting the scope of the invention to these exact embodiments. For example to collect acceleration components in different directions, the AMPG devices 1, 21, 31, 41, 51 discussed above can advantageously be used in a multiple manner, arriving at a AMPG device assembly, where the AMPG devices are mounted in different directions to collect acceleration components of different directions. See FIG. 1B as an example.

For all embodiments of the AMPG devises within this invention is the following applicable: They can be used as motion sensors with high accuracy and they are self supplying with power. They can for example be used as wireless burglar alarms, etc.

For all embodiments of the AMPG devises within this invention is the following applicable: They can be used as either passive motion dampers or active motion dampers. In case of passive use, the AMPG device will suppress the unwanted motion in accordance to the connected amount of load. In case of active use, the AMPG device will suppress the unwanted motion in accordance to the connected breaking power signal supplied to the active damper. The breaking power signal can be the result of another AMPG device used as sensor when the signal has been amplified. They can for example be used as active noise reduction in airplanes and vehicles, etc.

Figure 8A:
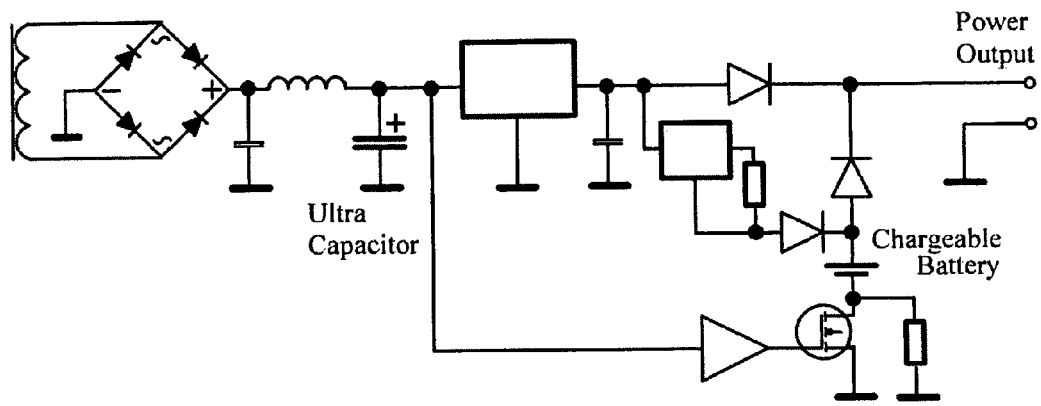
FIG. 8A-B shows variants of an electrical scheme possible to use with or in an AMPG device.
Figure 8B:
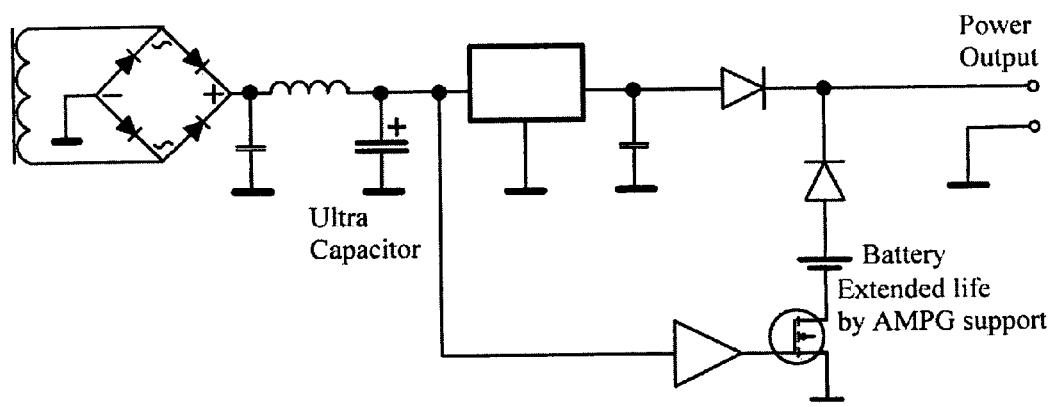
Figure 9:
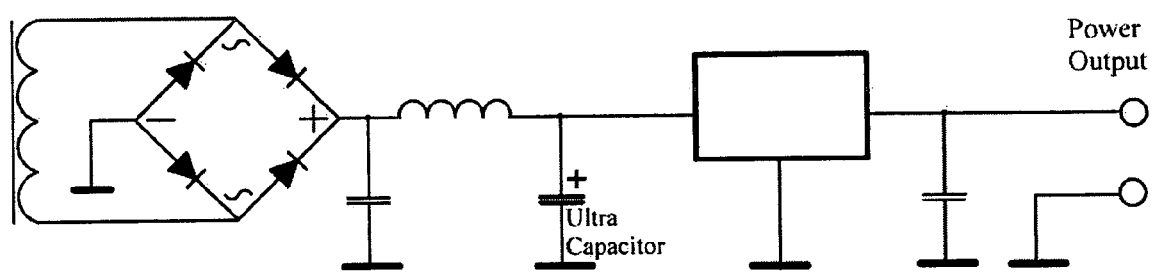
FIG. 9 shows another electrical scheme possible to use with or in an AMPG device.

For all embodiments of the AMPG devices in the thought of the invention, electronics equipment is comprised so as to take care of the generated electrical current. In particular this is important should a capacitor or an ultra capacitor will be used. Typical arrangement of the electronic hardware configuration needed can be studied in FIGS. 8 and 9, where a person skilled in the art of electronics directly sees how the electronics can be disposed in association with any of the AMPG devices discussed. It should be understood that the mentioned ultra capacitor of course can be an ordinary capacitor.

For all embodiments of the AMPG devises within this invention is the following applicable: They can be used as oscillating motors which are generating a oscillating movement when they are powered with an oscillated signal. They can for example be used as recoil or movement generators in computer game devices to make the experience more realistic.

The invention also comprises a method of optimizing the retrievable electrical power from AMPG devices. It has been shown in laboratory testing that the two characteristic natural frequencies of the AMPG's are highly important for the most efficient use of the AMPG's. To reach the most efficient use of the AMPG devices by matching those frequencies so that they are equal to or close to the most significant frequencies of the application in which they will be used. The common meaning of the methods described below is:

adapting the AMPG device's natural frequencies even called the AMPG device's resonance frequencies to the detected frequency ranges on the wanted application by changing the spring constants of at least one comprised spring member and/or by changing the moving mass in magnitude and/or changing the moving mass in position of the said AMPG device.

using the harmonized AMPG device in said measured frequency interval of said application on the same measured positions.

For some embodiments of the AMPG devices, those which are featured with a significant ability to effectively bounce between the limiting spring/limiting spring members, and where the function of the main spring/main spring members are basically to orient and support the moving mass/masses in the appropriate path, the need of tuning is concentrated to the most significant resonance frequency measured on the actual application. In those cases where this is applicable it is only necessary to harmonize the AMPG device's highest natural frequency, so-called f(resonance-high) and the f(resonance-low) is of minor importance. When following the stepwise method below, the method will be changed in step 2.3 to just: select the resonance frequency representing the highest content of mechanical energy, and this resonance frequency mentioned in 2.3, will set the parameters and is the goal frequency for dimensioning the f(resonance-high) of the AMPG device. All steps regarding f(resonance-low) can consequently be ignored.

To optimize the AMPG device's efficiency, the following stepwise method is calculated.

1. Measurements on the application
1.1 If the resonance frequencies and its contents of energy of the application, when it is running under its typical profile, are unknown, shall the following measurements according to 1.1.1, 1.1.2 be performed, otherwise proceed with 2.3.
1.1.1 Measure the complete frequency spectrum on the applications appropriate potential AMPG device attachment positions in X-, Y- and Z-directions. Use accelerometers connected to a frequency spectrum analyser.
1.1.2 Store the measured data, and present the result graphical for further analysis.
2. Analyses of measurements
See FIG. 10, which is representing one example of a measured application in one direction.
2.1 Find the most significant resonance frequencies for the application system.
2.2 Analysis the amplitude of the founded resonance frequencies.
2.3 Select the two resonance frequencies representing the highest content of mechanical energy.
3. Dimensioning of the natural frequencies of the AMPG device
3.1 The lowest of the two resonance frequencies mentioned in 2.3, will set the parameters and is the goal frequency for dimensioning the f(resonance-low) of the AMPG device.
3.2 Use the formula, $f(resonance)=(1/(2\times\pi))\times\sqrt{(k/m)}$, to calculate the relation between the moving mass, m and k(main).
3.3 Determine the moving mass, m and solve out k(main) or determine the k(main) and solve out the moving mass.
3.4 The highest of the two resonance frequencies mentioned in 2.3, will set the parameters and is the goal frequency for dimensioning the f(resonance-high) of the AMPG device.
3.5 Use the formula, $f(resonance)=(1/(2\times\pi))\times\sqrt{(k/m)}$, to calculate the relation between the moving mass, m and k(total)=f(k(main), k(limiting)), where k(total) is the result of the main spring/mainspring members spring constant together with the limiting spring/limiting spring members spring constant, when those springs are at the moving mass returning point (also possible to be measured as, the total force divided by the total deflected length, when the moving mass/masses are forced at the returning point). Due to the moving mass, m and k(main) are known from 3.3, it is possible to solve out k(limiting).

4. Dimensioning of the spring elements for the AMPG device 4.1 The easiest way to harmonize the AMPG device's resonance frequencies when the moving mass is given is to match the AMPG device moving mass with spring elements designed after the calculated spring constants. This can be done either with selection of suitable standard springs with specified spring constants in the unit Newton/meter, [N/m] or customizing the spring elements, using known standard formulas within mechanical engineering, such as:

$$F = k \times l \text{ (Spring law)}, \sigma = E \times \epsilon \text{ (Hookes law)}, \sigma = F/A \text{ (Stress law)}$$

Where:
F=Force in Newton, [N]
k=Spring constant, [N/m]
l=Length of deflection [m]
$\sigma$=Mechanical stress [MPa]
E=Elasticity modulus [MPa]
$\epsilon$=Mechanical strain
A=Cross section area of the spring element [$m^2$]

4.2 For more complex spring elements other methods with for example elementary cases formulas or FEM-calculation can be used. It is also possible to in a practical way tune the spring elements with a dynamometer and iterated machining operations.

5. Dimensioning of the moving mass elements for the AMPG device 5.1 The easiest way to harmonize the AMPG device's resonance frequencies when the spring constants are given is to match the AMPG device's spring elements with the calculated mass. Adding weight means that the resonance frequencies will decrease. Removing weight means that the resonance frequencies will increase. This can be done with a system of attaching/detaching a set of elemental weights.

6. Categorised AMPG devices 6.1 In a further use of the method according to step 1-5 prefabricated AMPG devices will be tuned and categorised within the most common frequency spectrums. This will simplify the procedure. When step 1-2 is performed it is possible to select and order from a systematically arranged catalogue of specified AMPG devices where the two characteristic resonance frequencies can be found in the nearest interval.

6.2 In case of several widely spread resonance frequencies is present, it is preferable to use a number of AMPG devices covering the most usable frequency areas in the actual application.

7. Usage of adjustable AMPG devices

The said tuning can also be done with adjustments of the spring elements or the magnitude and/or position of the moving mass on a universal AMPG device. In a universal AMPG device it is possible to adjust the two characteristic natural frequencies of the AMPG devices within two intervals, the high- and the low resonance frequencies spectrums.

7.1 Continues adjustment. This can be made through adjusting the spring constants in the main spring and/or limiting springs by changing the deflection length of the said spring elements. The natural frequencies of the AMPG device will decrease with larger deflecting lengths and they will increase with smaller deflecting lengths.

7.2 Discrete adjustment. In another embodiment of a universal AMPG device the adjustment of the natural frequencies can be done by a set of prearranged spring elements. Those can be installed and used in a combination, which result in the wanted resonance frequencies within a number of discrete steps.

7.3 Continues adjustment. In another embodiment of a universal AMPG device the adjustment of the natural frequencies can be done by adjusting the moving mass in an infinite way with varying the content in a balance container, such as varying the amount of liquid in a volume.

7.4 Continues adjustment. In another embodiment of a universal AMPG device the adjustment of the natural frequencies can be done by adjusting the position of the moving mass in regard to the revolving axis. This will vary the inertia for the system and affect the natural frequencies.

7.5 Continues adjustment. In another embodiment of a universal AMPG device the adjustment of the natural frequencies can be done by moving the axis of rotation of the AMPG device. This will vary the inertia for the system and affect the natural frequencies.

7.6 Discrete adjustment. In another embodiment of a universal AMPG device the adjustment of the natural frequencies can be done by a set of prearranged weights. Those can be installed and used in a combination, which result in the wanted resonance frequencies within a number of discrete steps.

8. Adjusting the load connected to the AMPG devices

For applications where the frequency pattern is very regular and predicted, it is possible to optimize the electrical output by adjusting the load connected to the AMPG devices. This method can be applied to all embodiments of the AMPG devices.

8.1 Sinusoidal cases. To make it possible to reach maximum output, when the sinusoidal vibration is limited in content of energy, it is highly effective to adjust the load to a level just below the limit when the moving mass stops vibrating. The reason why this is doable, is when the load is increased the moving mass will be affected with a larger breaking force slowing down the movement, i.e. when the load is decreased the moving mass will be effected with a smaller breaking force which allows the moving mass to continue oscillating when the amount of energy content in the vibration is low.

8.2 In another embodiment of the AMPG device, it comprises an electronic circuit which is measuring the amplitude of the output signal, and adjust the resistance connected to the circuit board so that the output will always be at maximum level, a so-called regulator.

8.3 Random vibration cases. To make it possible to reach maximum output, when the random vibration is limited in content of energy, it is highly effective to adjust the load to a level just below the limit when the moving mass stops vibrating, but this will only be the case in intermittently intervals. Within those intervals the same regulating technique is used, as in the sinusoidal case 8.1-8.2.

8.4 The method described under step 8, still requires at least the previous optimizing steps described under step 1-3.

EXAMPLE OF MEASUREMENT

Figure 10:
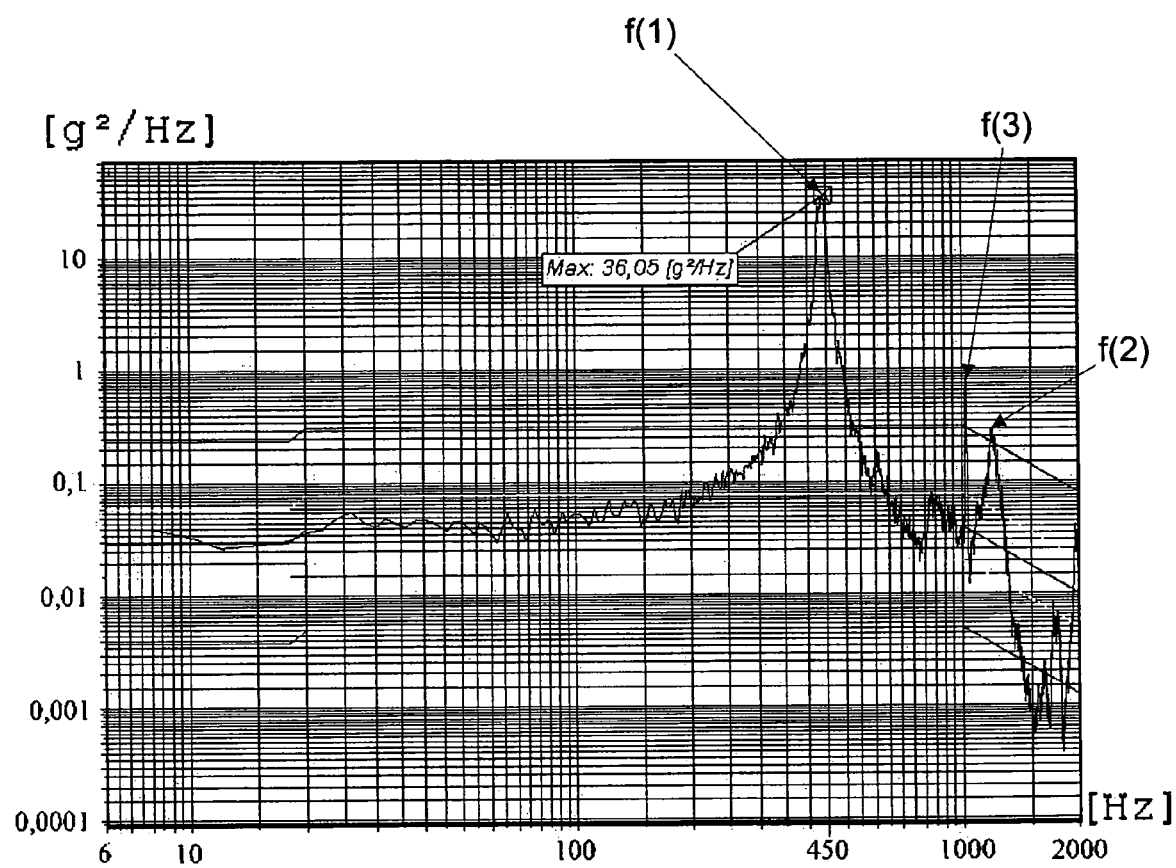
FIG. 10 shows a diagram of measured frequencies of an application in which an AMPG device can be used and optimized.

In FIG. 10 is shown stored measured data with graphical result presented for analysis.

The graph shows a plot of the spectrum of vibration power density [$g^2$/Hz] versus the frequency [Hz] on the measured point of the application. In picture below are three significant resonance frequencies shown. They are arranged in the following order, f(1)-f(3), representing the most significant resonance frequencies with regard to the content of energy. This means that f(1) represents f(resonance-low) and f(2) represents f(resonance-high). f(3) is a resonance frequency with less amount of energy and will not be used. Depending of which type of AMPG device we are dealing with, shall f(1) and f(2) be utilized on the most efficient way, taking care of the basic role in the method mentioned in the beginning of the description.

The invention claimed is:

1. An accumulating motion pulse generator device for generation of electrical energy, comprising,
    three bobbins arranged in a row, wherein a central bobbin does not include a core and bobbins arranged on opposite sides of the central bobbin each include a core,
    at least one magnet, and
    at least one first spring member, wherein said at least one magnet is arranged to be movable together with said at least one first spring member, wherein said device is arranged so that when exposed to an acceleration component in a possible path of mobility of said at least one magnet, said at least one magnet will due to an association with said at least one first spring member arranged to move along an arcuate path in an oscillating manner in relation to said bobbins, so as to generate electrical energy, and
    a second spring member at a limiting position of said path of mobility of the at least one magnet, for limiting said path of mobility.

2. The accumulating motion pulse generator device according to claim 1, wherein the second spring member has an equal or higher spring constant than the spring constant of the first spring member.

3. The accumulating motion pulse generator device according to claim 1, wherein said at least one magnet comprises Neodymium.

4. The accumulating motion pulse generator device according to claim 1, wherein said second spring member comprises a helical spring.

5. The accumulating motion pulse generator device according to claim 1, wherein said second spring member comprises a plate spring.

6. The accumulating motion pulse generator device according to claim 1, wherein said second spring member comprises a cloth.

7. The accumulating motion pulse generator device according to claim 6, wherein said cloth comprises a rubber cloth.

8. The accumulating motion pulse generator device according to claim 1, wherein said second spring member comprises second magnets, with reversed magnetic field to each other so as to act as a spring.

9. The accumulating motion pulse generator device according to claim 8, wherein said second magnets comprises Neodymium.

10. The accumulating motion pulse generator device according to claim 1, wherein said first spring member comprises a spiral spring.

11. The accumulating motion pulse generator device according to claim 10, wherein said second spring member comprises a plate spring member comprised in said first spring.

12. The accumulating motion pulse generator device according to claim 1, wherein said second spring member comprises a combination of second magnets and mechanical springs.

13. The accumulating motion pulse generator device according to claim 1, wherein the outer shape of the accumulating motion pulse generator device is arranged so that said accumulating motion pulse generator device is mountable in a standard holder for a battery for use in a standard battery demanding application.

14. The accumulating motion pulse generator device according to claim 13, wherein an outer shell of the accumulating motion pulse generator device comprises a high friction material.

15. The accumulating motion pulse generator device according to claim 14, wherein the outer shell comprises elastomer.

16. The accumulating motion pulse generator device according to claim 14, wherein the outer shell comprises rubber.

17. The accumulating motion pulse generator device according to claim 1, wherein the device is optimized for collection of acceleration components in its transversal direction by comprising a rotor with an eccentric mass balance, said rotor comprises said first magnet.

18. The accumulating motion pulse generator device according to 1, wherein the first spring member is a spiral spring associated with said rotor.

19. The accumulating motion pulse generator device according to claim 1, wherein the first spring member comprises a pair of spiral springs, oriented towards each other in opposite direction.

20. The accumulating motion pulse generator device according to claim 1, wherein the device is optimized for collection of acceleration components in a longitudinal direction of the device, by associating said at least one magnet with a spring member of helical type allowing said at least one magnet to move close to said three bobbins in the longitudinal direction of said device.

21. The accumulating motion pulse generator device according to claim 1, wherein the cores are arranged to guide the changing magnetic field through the coil in the bobbin.

22. The accumulating motion pulse generator device according to claim 21, wherein the cores are laminated.

23. The accumulating motion pulse generator device according to claim 21, wherein the core comprises μ-metal.

24. The accumulating motion pulse generator device according to claim 1, wherein the device includes three magnets mounted close to each other with essentially the reversed magnetic field direction so as to provide for achieving a quick change of magnetic field, when the magnets with reversed magnetic fields pass a gap in the core which passes through the bobbin.

25. An accumulating motion pulse generator device according to claim 24, the magnets are mounted close to each other at equally distances between each other, with alternating magnetic field directions.

26. The accumulating motion pulse generator device according to claim 1, wherein the device comprises three magnets arranged in a row and having reversed magnetic field direction.

27. The accumulating motion pulse generator device according to claim 26, wherein the magnets are arranged in an arc.

28. The accumulating motion pulse generator device according to claim 1, wherein the bobbins are arranged in an arc.

29. The accumulating motion pulse generator device according to claim 1, wherein the cores comprise μ-metal.

30. A printed circuit board, comprising:

at least one accumulating motion pulse generator device comprising three bobbins arranged in a row, wherein a central bobbin does not include a core and bobbins arranged on opposite sides of the central bobbin each include a core, at least one magnet, and at least one first spring member, wherein said at least one magnet is arranged to be movable together with said at least one first spring member, wherein said device is arranged so that when exposed to an acceleration component in a possible path of mobility of said at least one magnet, said at least one magnet will due to an association with said at least one first spring member arranged to move along an arcuate path in an oscillating manner in relation to said bobbins, so as to generate electrical energy, and a second spring member at a limiting position of said path of mobility of the at least one magnet, for limiting said path of mobility.

31. An accumulating motion pulse generator device assembly comprising at least two of the accumulating motion pulse generator devices each comprising three bobbins arranged in a row, wherein a central bobbin does not include a core and bobbins arranged on opposite sides of the central bobbin each include a core, at least one magnet, and at least one first spring member, wherein said at least one magnet is arranged to be movable together with said at least one first spring member, wherein said device is arranged so that when exposed to an acceleration component in a possible path of mobility of said at least one magnet, said at least one magnet will due to an association with said at least one first spring member arranged to move along an arcuate path in an oscillating manner in relation to said bobbins, so as to generate electrical energy, and a second spring member at a limiting position of said path of mobility of the at least one magnet, for limiting said path of mobility, wherein the accumulating motion pulse generator devices are mounted angularly displaced relative to each other, whereby the accumulating motion pulse generator device assembly is able to collect acceleration components in more than one direction.

\* \* \* \* \*